(12) United States Patent
Barnette et al.

(10) Patent No.: US 8,079,467 B2
(45) Date of Patent: Dec. 20, 2011

(54) MEDIA STORAGE CONTAINER WITH STORABLE LATCH

(75) Inventors: Timothy L. Barnette, Suwanee, GA (US); Mark E. Heuser, Strongsville, OH (US); Jose P. Garcia, Terre Haute, IN (US); Jesse D. Wells, Canton, OH (US)

(73) Assignee: Atlas AGI Holdings, LLC, Greenwich, CT (US)

( * ) Notice: Subject to any disclaimer, the term of this patent is extended or adjusted under 35 U.S.C. 154(b) by 1352 days.

(21) Appl. No.: 11/607,442

(22) Filed: Dec. 1, 2006

(65) Prior Publication Data

US 2007/0215498 A1    Sep. 20, 2007

Related U.S. Application Data

(60) Provisional application No. 60/741,708, filed on Dec. 2, 2005.

(51) Int. Cl.
*B65D 85/30* (2006.01)
(52) U.S. Cl. .................. 206/308.1; 206/370; 206/1.5
(58) Field of Classification Search ............... 206/308.1, 206/307, 308.3, 312, 387.1, 387.11, 303, 206/1.5
See application file for complete search history.

(56) References Cited

U.S. PATENT DOCUMENTS

| | | |
|---|---|---|
| 976,165 A | 11/1910 | Gray |
| 1,774,543 A | 9/1930 | Babbitt |
| 2,411,946 A | 12/1946 | Vogel |
| 3,108,734 A * | 10/1963 | Hewko ..................... 206/39 |
| 3,175,853 A | 3/1965 | Gilbertson |
| 3,306,520 A | 2/1967 | Allard |
| 3,414,157 A | 12/1968 | Wright |
| 3,485,408 A | 12/1969 | Benesch |
| 3,494,458 A | 2/1970 | Meierhoefer |
| 3,583,556 A | 6/1971 | Wagner |
| 3,635,331 A | 1/1972 | Zucker |
| 3,858,749 A | 1/1975 | Sellzy et al. |
| 3,876,071 A | 4/1975 | Neal et al. |
| 3,907,103 A | 9/1975 | Shaw |
| 3,933,381 A | 1/1976 | Schurman |
| 3,990,575 A | 11/1976 | Egly |
| 4,011,940 A | 3/1977 | Neal et al. |
| 4,054,206 A | 10/1977 | Kobayashi et al. |
| 4,078,657 A | 3/1978 | Schurman |
| 4,102,452 A | 7/1978 | Sato et al. |
| 4,105,112 A | 8/1978 | Graf |
| 4,153,178 A | 5/1979 | Weavers |
| 4,231,474 A | 11/1980 | Takahashi |
| 4,248,345 A | 2/1981 | Bowers |
| 4,291,801 A | 9/1981 | Basili et al. |

(Continued)

FOREIGN PATENT DOCUMENTS

EP    0 233 163 A1    8/1987

(Continued)

*Primary Examiner* — Nathan J Newhouse
*Assistant Examiner* — King M Chu
(74) *Attorney, Agent, or Firm* — Pillsbury Winthrop Shaw Pittman LLP

(57) ABSTRACT

A media storage container has a latch that is movable between latched, unlatched, and storage positions. The latch is disposed at the indented portion of the front wall of the container. A latch retaining device releasably secures the latch in the storage position. A portion of the latch retaining device is disposed inwardly of the front wall of the container.

20 Claims, 8 Drawing Sheets

U.S. PATENT DOCUMENTS

| | | | |
|---|---|---|---|
| 4,293,266 A | 10/1981 | St. Lawrence | |
| 4,344,646 A | 8/1982 | Michel | |
| 4,365,711 A * | 12/1982 | Long et al. | 206/387.13 |
| 4,381,836 A | 5/1983 | Rivkin et al. | |
| 4,489,832 A | 12/1984 | Helms | |
| 4,512,470 A | 4/1985 | Sieben | |
| 4,531,670 A | 7/1985 | Kupersmit | |
| 4,610,371 A | 9/1986 | Karkiewicz | |
| 4,634,004 A | 1/1987 | Mortensen | |
| 4,643,281 A | 2/1987 | Erickson | |
| 4,746,008 A | 5/1988 | Heverly et al. | |
| 4,805,769 A | 2/1989 | Soltis et al. | |
| 4,834,238 A | 5/1989 | Hehn et al. | |
| 4,838,420 A | 6/1989 | Collett et al. | |
| 4,865,190 A | 9/1989 | Gregerson et al. | |
| 4,871,065 A | 10/1989 | Hehn et al. | |
| 4,892,189 A | 1/1990 | Kunimune et al. | |
| 4,921,097 A | 5/1990 | Finke et al. | |
| 4,974,740 A | 12/1990 | Niles | |
| 5,033,778 A | 7/1991 | Niles et al. | |
| 5,148,914 A | 9/1992 | Budert et al. | |
| 5,211,283 A | 5/1993 | Weisburn et al. | |
| 5,215,188 A | 6/1993 | Wittman | |
| 5,219,087 A | 6/1993 | Christensson | |
| 5,259,221 A | 11/1993 | Whitmore | |
| 5,285,918 A | 2/1994 | Weisburn | |
| 5,297,672 A | 3/1994 | MacTavish | |
| 5,305,873 A | 4/1994 | Joyce | |
| 5,417,319 A | 5/1995 | Chalberg et al. | |
| 5,443,159 A | 8/1995 | Cheng | |
| 5,460,266 A | 10/1995 | Mundorf et al. | |
| 5,499,714 A | 3/1996 | Konno | |
| 5,509,528 A | 4/1996 | Weisburn | |
| 5,515,967 A | 5/1996 | Fitzsimmons | |
| 5,551,560 A | 9/1996 | Weisburn et al. | |
| 5,562,207 A | 10/1996 | O'Brien et al. | |
| 5,566,828 A | 10/1996 | Claes et al. | |
| 5,575,399 A | 11/1996 | Intini | |
| 5,597,068 A | 1/1997 | Weisburn et al. | |
| 5,636,737 A | 6/1997 | Marsilio | |
| 5,645,167 A | 7/1997 | Conrad | |
| 5,662,218 A | 9/1997 | Ladwig | |
| 5,664,405 A | 9/1997 | Perego | |
| 5,680,932 A | 10/1997 | Dickinson | |
| 5,682,991 A | 11/1997 | Lammerant et al. | |
| 5,697,498 A | 12/1997 | Weisburn | |
| 5,718,332 A | 2/1998 | Tachibana | |
| 5,727,681 A | 3/1998 | Li | |
| 5,730,283 A | 3/1998 | Lax | |
| 5,762,187 A | 6/1998 | Belden, Jr. et al. | |
| 5,769,218 A | 6/1998 | Yabe | |
| 5,779,039 A | 7/1998 | Ambrus | |
| 5,782,350 A | 7/1998 | Weisburn et al. | |
| 5,782,352 A | 7/1998 | Senda | |
| 5,788,068 A | 8/1998 | Fraser et al. | |
| 5,788,105 A | 8/1998 | Foos | |
| 5,799,782 A | 9/1998 | Gelardi | |
| 5,819,929 A | 10/1998 | Chung | |
| 5,823,341 A | 10/1998 | Nakasuji | |
| 5,878,878 A | 3/1999 | Wu | |
| 5,899,327 A | 5/1999 | Sykes | |
| 5,901,840 A | 5/1999 | Nakasuji | |
| 5,904,246 A | 5/1999 | Weisburn et al. | |
| 5,906,274 A | 5/1999 | McEwan | |
| 5,931,291 A | 8/1999 | Sedon et al. | |
| 5,931,294 A | 8/1999 | Weingarden | |
| 5,934,114 A | 8/1999 | Weisburn et al. | |
| 5,944,173 A | 8/1999 | Boire et al. | |
| 5,944,181 A | 8/1999 | Lau | |
| 5,944,185 A | 8/1999 | Burdett et al. | |
| 5,988,375 A | 11/1999 | Chang | |
| 5,988,376 A | 11/1999 | Lax | |
| 5,996,788 A | 12/1999 | Belden, Jr. et al. | |
| 6,070,721 A | 6/2000 | Levitan | |
| 6,070,722 A | 6/2000 | Ng | |
| 6,076,667 A | 6/2000 | Ambrus | |
| 6,082,156 A | 7/2000 | Bin | |
| 6,102,200 A | 8/2000 | Dressen et al. | |
| 6,105,767 A | 8/2000 | Vasudeva | |
| 6,119,857 A | 9/2000 | Stumpff | |
| 6,135,280 A | 10/2000 | Burdett et al. | |
| 6,155,087 A | 12/2000 | Necchi | |
| 6,155,417 A | 12/2000 | Flores, Jr. et al. | |
| 6,164,446 A | 12/2000 | Law | |
| 6,196,384 B1 | 3/2001 | Belden, Jr. | |
| 6,206,185 B1 | 3/2001 | Ke et al. | |
| 6,206,186 B1 | 3/2001 | Cerda-Vilaplana et al. | |
| 6,398,022 B1 | 6/2002 | Mou et al. | |
| 6,467,616 B2 | 10/2002 | Hegarty | |
| 6,478,150 B1 | 11/2002 | Solling | |
| 6,719,133 B2 | 4/2004 | Perez et al. | |
| 6,789,692 B2 | 9/2004 | Prezelin | |
| 6,832,686 B2 | 12/2004 | Donegan | |
| 6,863,175 B2 | 3/2005 | Gelardi | |
| 6,907,987 B2 * | 6/2005 | Lee | 206/308.2 |
| 6,981,586 B2 | 1/2006 | Onmori et al. | |
| D544,743 S | 6/2007 | Lax et al. | |
| 2002/0033348 A1 | 3/2002 | Flores | |
| 2002/0096517 A1 | 7/2002 | Gelardi | |
| 2003/0000856 A1 | 1/2003 | Lax | |
| 2003/0075463 A1 | 4/2003 | Perez et al. | |
| 2003/0116455 A1 | 6/2003 | Marsilio | |
| 2003/0121296 A1 | 7/2003 | Cheung | |
| 2003/0146119 A1 * | 8/2003 | Lee | 206/310 |
| 2003/0173369 A1 | 9/2003 | Nikolaus et al. | |
| 2003/0217939 A1 | 11/2003 | Hegarty | |
| 2004/0144662 A1 | 7/2004 | Bolognia | |
| 2004/0188286 A1 | 9/2004 | Lax | |
| 2005/0077196 A1 | 4/2005 | Corley | |
| 2005/0121950 A1 | 6/2005 | Hegarty | |
| 2005/0145530 A1 | 7/2005 | Gelardi | |
| 2005/0160774 A1 | 7/2005 | Weinstein | |
| 2005/0269223 A1 | 12/2005 | Wawrzynowski | |
| 2006/0032860 A1 * | 2/2006 | Hase | 220/831 |
| 2006/0196790 A1 | 9/2006 | Perez | |
| 2007/0102309 A1 | 5/2007 | Osborn | |
| 2007/0102310 A1 | 5/2007 | Osborn | |
| 2007/0163902 A1 | 7/2007 | Osborn | |
| 2007/0267305 A1 | 11/2007 | Johnston | |
| 2008/0011625 A1 | 1/2008 | Gelardi | |
| 2008/0017542 A1 | 1/2008 | Le | |

FOREIGN PATENT DOCUMENTS

| | | |
|---|---|---|
| WO | WO 99/59153 | 11/1999 |
| WO | WO 2006/058119 A1 | 6/2006 |

* cited by examiner

MEDIA STORAGE CONTAINER WITH STORABLE LATCH

CROSS REFERENCE TO RELATED APPLICATIONS

This application claims the benefit, under 35 U.S.C. §119 (e), of United States Provisional Patent Application No. 60/741,708 filed 2 Dec. 2005.

BACKGROUND OF THE INVENTION

1. Technical Field

The present invention generally relates to media storage containers and, more particularly, to media storage containers having latches that are used to keep the lid and base together in the closed position until the latch is moved to an unlatched position. Specifically, the invention relates to a media storage container having a latch that is movable to a storage position which allows the lid to be opened and closed.

2. Background Information

A variety of latches have been used with media storage containers to hold the container lid closed with respect to the container base. Drawbacks with existing containers include the need to close the latches when the containers are shipped. Closed latches must be unlatched before the containers are loaded with media. When latches are left opened for shipment, extra room must be provided in the shipping containers. Another drawback is that consumers must tear some latches from the containers once the containers have been purchased. If the consumer wishes to retain the latches and use them from time to time, the latches are otherwise hanging outwardly from the container when not being used. A media storage container having a latch that may be moved to a storage position is thus desired in the media packaging art.

SUMMARY OF THE INVENTION

In one configuration, the invention provides a media storage container having a latch that is movable between latched, unlatched, and storage positions. The latch is disposed inside the outer perimeter of the container when the latch is in the storage position. A portion of the latch extends across the front wall of the base when the latch is in the storage position.

The invention also provides a configuration wherein the latch may be moved from the latched position to the unlatched position without the use of a specially designed key.

The invention further provides a method for opening a media storage container and a method for loading an item of recorded media into the media storage container.

DETAILED DESCRIPTION OF THE INVENTION

Figure 1:
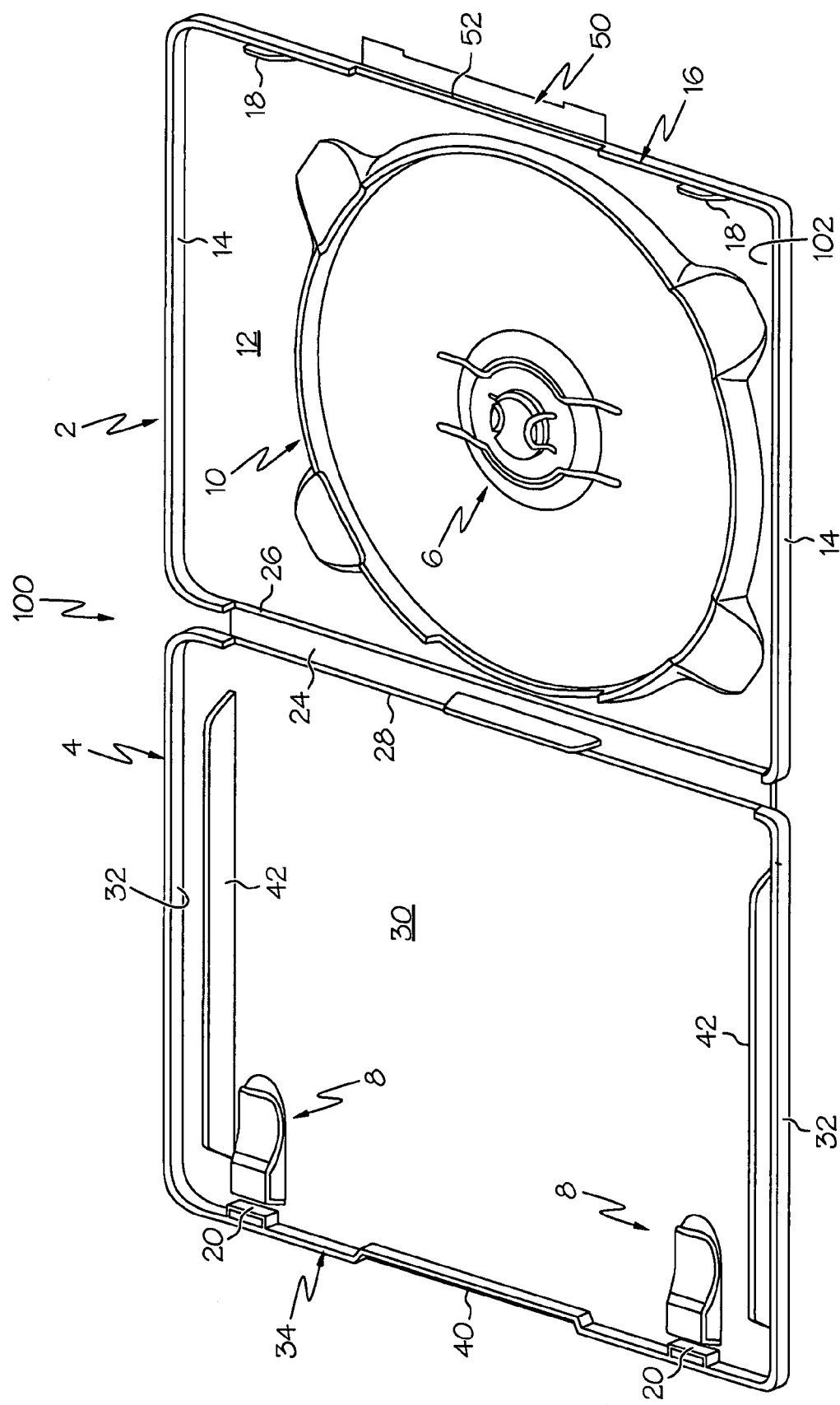
FIG. 1 is a perspective view of an exemplary media storage container having an external latch showing the latch in an unlatched position.
Figure 2:
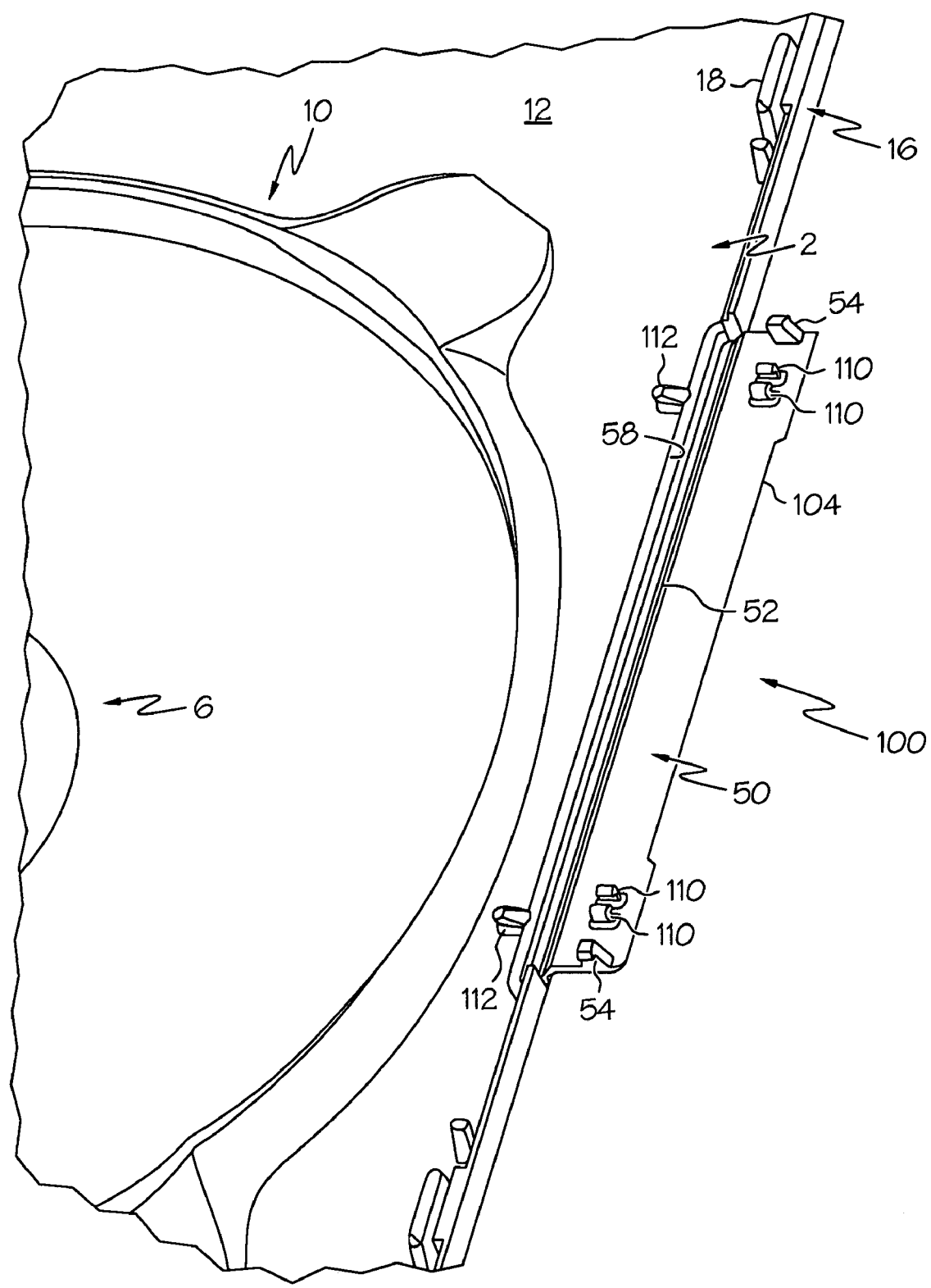
FIG. 2 is a perspective view of the latch in the unlatched position.
Figure 3:
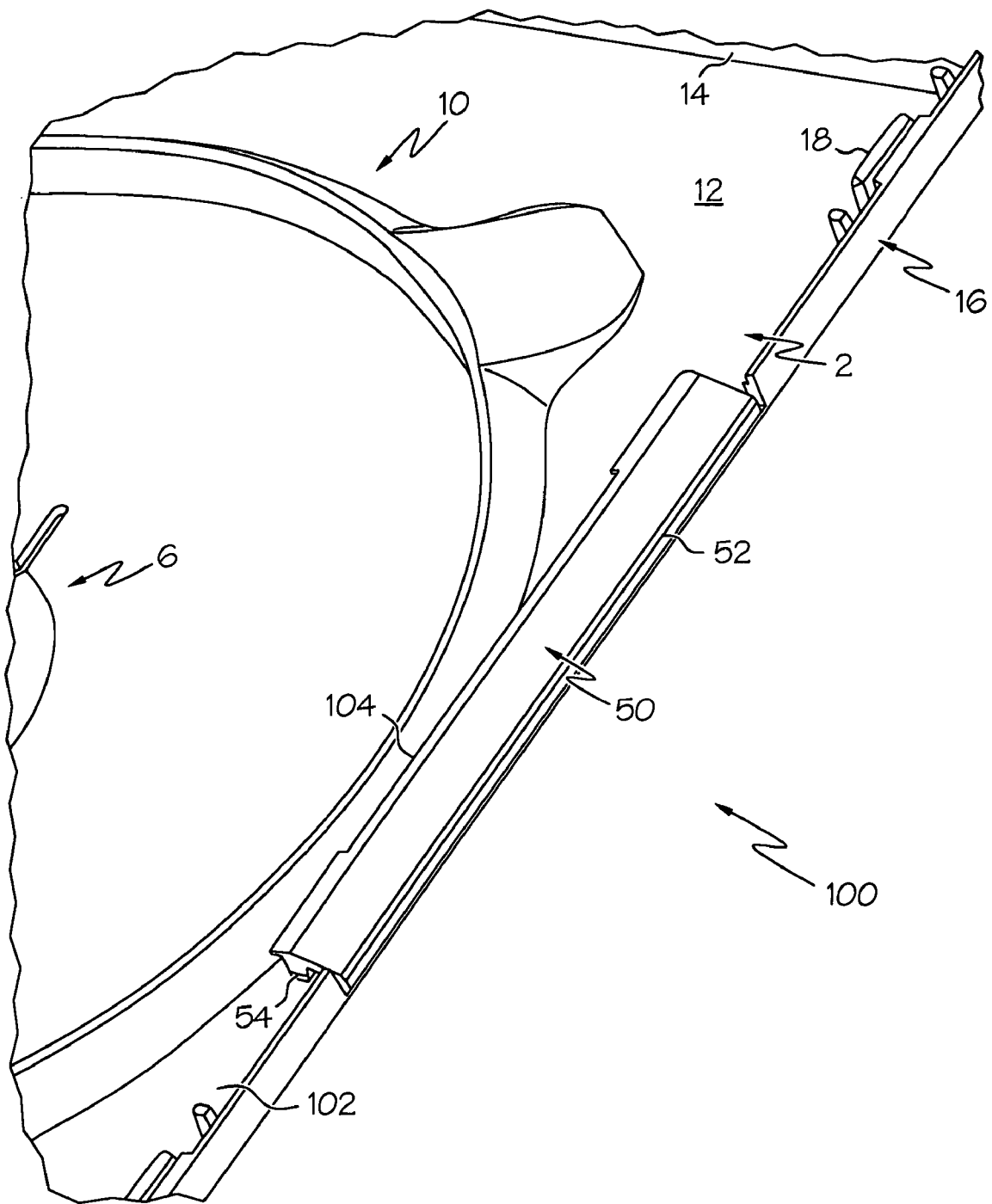
FIG. 3 is a perspective view of the latch in a storage position.
Figure 4:
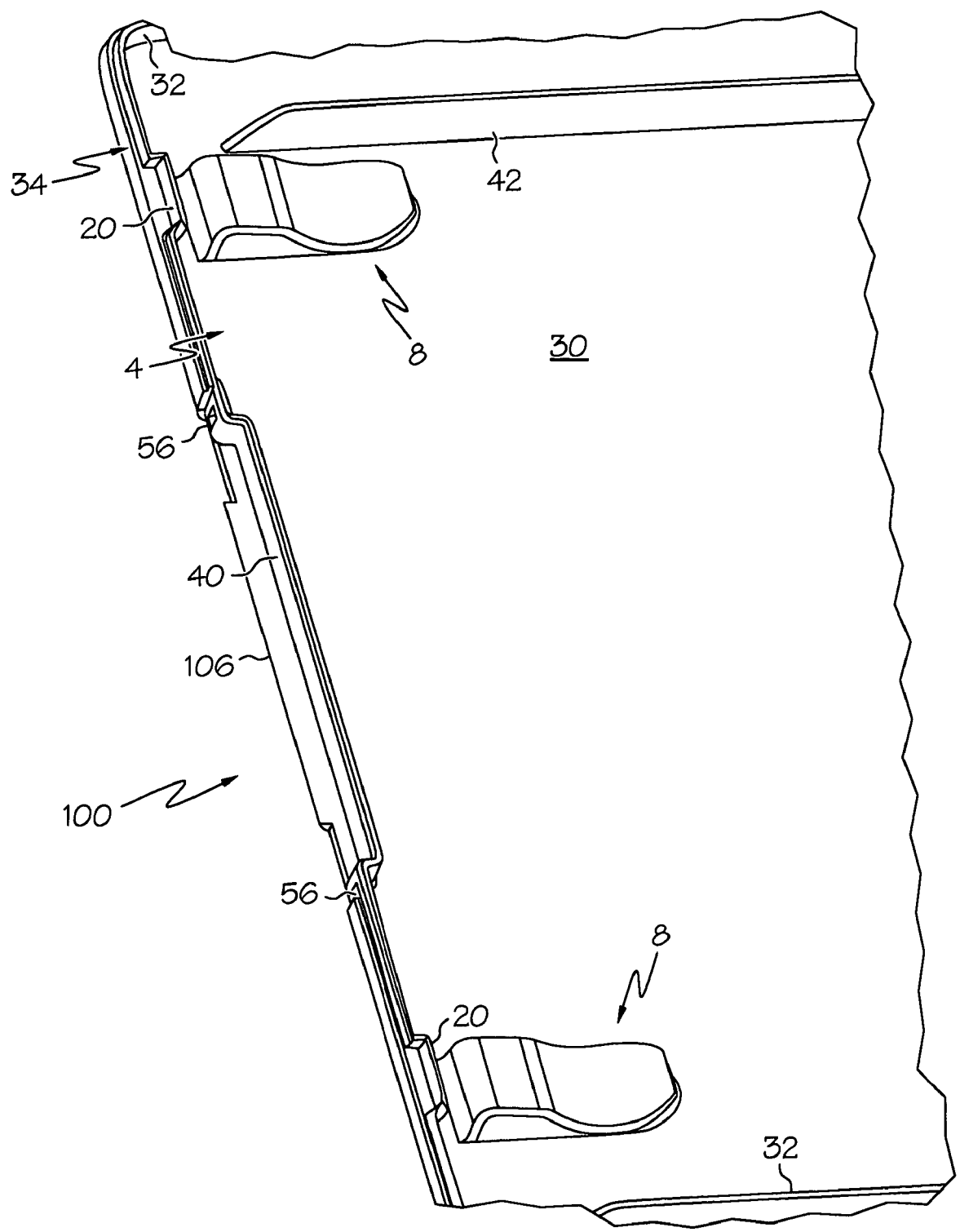
FIG. 4 is a perspective view of the portion of the lid that is engaged by the latch when the latch is in the latched position.
Figure 5:
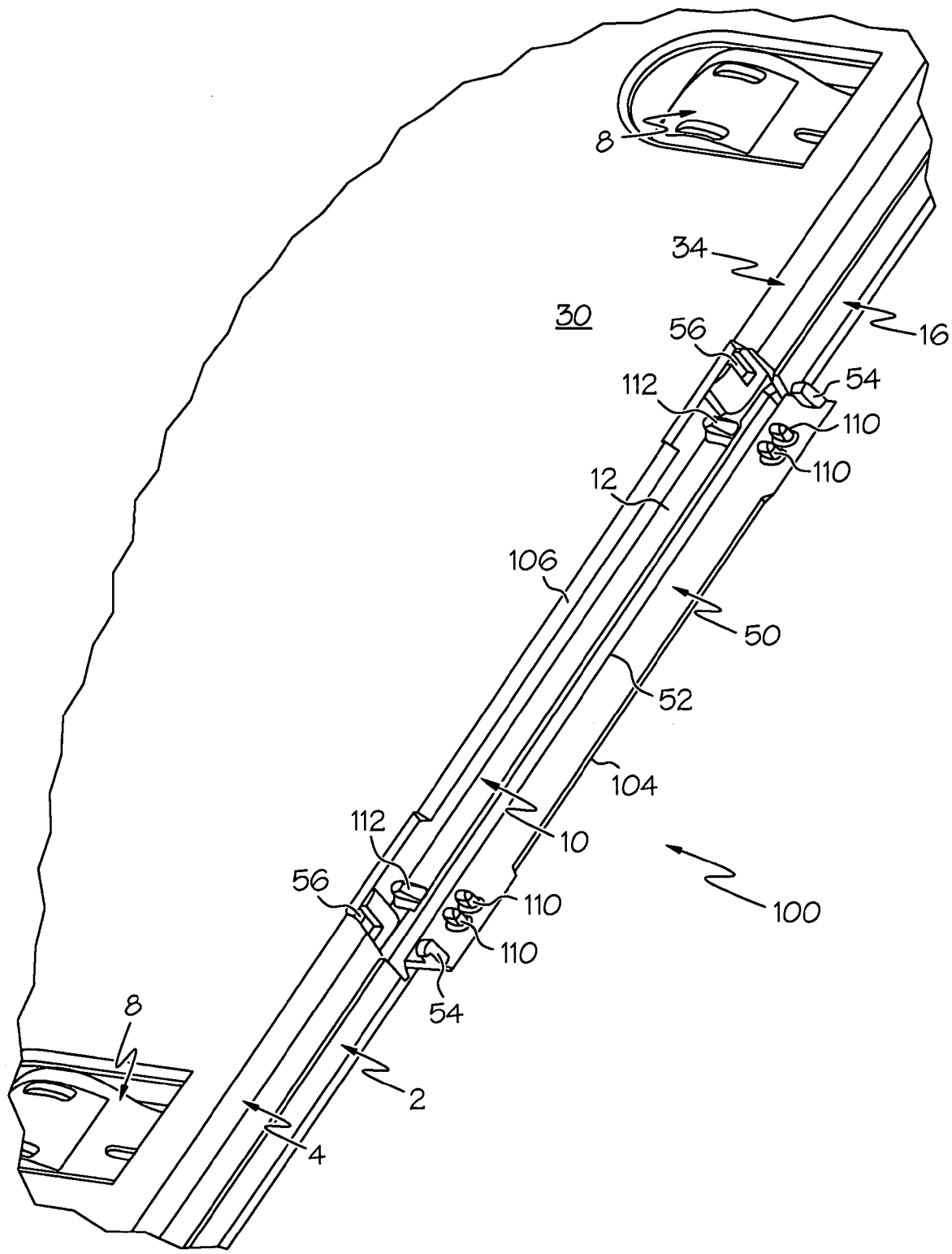
FIG. 5 is a perspective view of the container in the closed position with the latch in the unlatched position.
Figure 6:
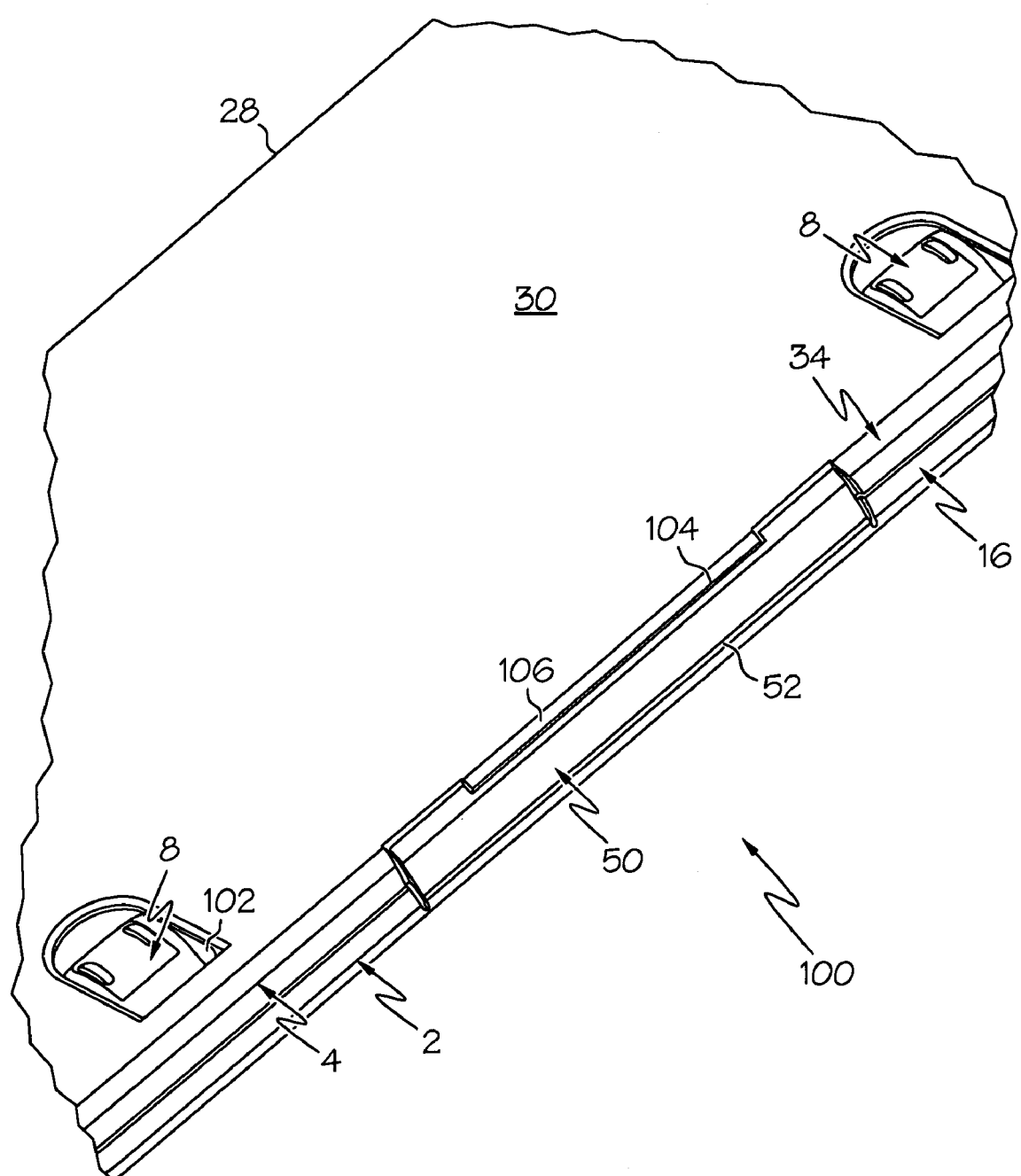
FIG. 6 is a perspective view of the container in the closed position with the latch in the latched position.

Common reference numerals are used in the following descriptions of the different configurations of the media storage container for similar parts of the containers. In general, the following container configurations have a base 2 and a lid 4. The lid and base may also be referred to as a container portions. These portions are movable relative to one another between open and closed positions. The open position provides access to the item stored within the container while the closed position inhibits such access. When the portions are closed, the container has an outer periphery that is defined as the outer boundaries of the container. This outer boundary—and thus the outer periphery—extends across openings and indentations defined by a container surface. The outer boundaries are the outermost surfaces of the container portions. Although the portions are typically hinged together to form a clamshell arrangement, some containers utilize a sliding configuration while others allow the portions to become completely separated when in the open position.

One, or both, of base 2 and lid 4 includes a media retainer 6 adapted to retain an item of recorded media. Retainer 6 may be a hub such as those known in the art for holding CDs and DVDs. The hub may be a push button-type hub or a fixed position hub. Retainer 6 also may be a disc retainer or cartridge retainer that holds the outer edges of a media cartridge. Retainer 6 also may be a pocket that allows at least a portion of the item of recorded media to be slipped into the pocket. Base 2 and lid 4 may further include a second retainer 6 that may or may not be different than the first retainer 6. One of base 2 and lid 4 may also include literature booklet retainers 8. When retainer 6 is configured to hold a media disc (such as a CD or a DVD), a nest wall 10 may be disposed around retainer 6.

Base 2 generally includes a bottom wall 12 sized to cover the item of recorded media to be held by the media storage container. A peripheral wall including sidewalls and a front wall projects upwardly from the outer peripheral edge or near the outer peripheral edge of bottom wall 12. Sidewalls 14 project upwardly from opposite lateral edges of bottom wall 12. Sidewalls 14 are generally disposed perpendicular to bottom wall 12. Base 2 also includes a front wall 16 that generally extends perpendicular to sidewalls 14 and to bottom wall 12. Front wall 16 may be integrally connected to sidewalls 14 at the corners of base 2. In containers having bottom walls 12 that end at sidewalls 14 and front wall 16, the outermost surfaces of sidewalls 14 and front wall 16 define a portion of the outer periphery of the container. When bottom wall 12 extends beyond the outer surface of front wall 16 to form a ledge, the outer periphery of the container is defined by the outermost edge of bottom wall 12.

Inner lid retainers 18 are typically disposed adjacent front wall 16 for holding lid 4 closed as is know in the art. Retainers 18 also may be positioned adjacent sidewalls 14 or inwardly from either sidewalls 14 or front wall 16. Retainers 18 frictionally hold or hold with a snap-fit a foot portion 20 of lid 4 to prevent lid 4 from undesirably swinging open. Foot portions 20 may be enlarged to snap fit into retainers 18. Retainers 18 may be disposed on lid 4 with foot portions 20 being disposed on base 2.

Base 2 may also include a hinge wall 24 that is connected to bottom wall 12 with a first hinge 26 such as a living hinge.

Hinge wall 24 may be connected to lid 4 with a second hinge 28 such as a second living hinge 28 spaced from and disposed parallel to the first living hinge 26. Second living hinge 28 may be connected to a top wall 30 of lid 4. The outermost surface of hinge wall 24 defines a portion of the outer periphery of the container when base 2 and lid 4 do not extend beyond hinge wall 24.

Sidewalls 32 project outwardly from opposite lateral edges of top wall 30. Sidewalls 32 are disposed perpendicular to top wall 30. Lid 4 also includes a front wall 34 that is perpendicular to sidewalls 32 and to top wall 30. Front wall 34 is integrally connected to sidewalls 32 at the corners of lid 4. In containers having top walls 20 that end at sidewalls 32 and front wall 34, the outermost surfaces of sidewalls 32 and front wall 34 define a portion of the outer periphery of the container. Front walls 34 and 16 define an indented or concave central portion 40 the surfaces that define indent 40 are not a portion of the outer periphery of the container. Lid 4 may include a rib 42 disposed perpendicular to hinges 26 and 28. Rib 42 is spaced inwardly of sidewall 32 and may be used to support the upper edge of a literature booklet retained by retainers 8. Rib 42 may be aligned with the upper end of hinge wall 24 which is inset from the upper ends of base 2 and lid 4. A corresponding rib 42 may be disposed along the bottom of lid 4.

Each of the following configurations includes a latch 50 that is movable between an unlatched position (allowing lid 4 to be opened and closed with respect to base 2) to a latched position (wherein lid 4 is held in its closed position). In a first embodiment of each configuration, latch 50 may be moved from the latched position to the unlatched position without the need for a specially designed key. Each latch 50 is connected to one of base 2 and lid 4. In the exemplary configurations, latches 50 are connected to bases 2. Latches 50 also may be connected to lids 4 with the appropriate elements reversed on container. Unless otherwise specified, the invention functions in a similar manner regardless to which container portion (base or lid) latch 50 is connected. In the exemplary embodiments, each latch 50 is connected to the container with a hinge 52 that allows latch 50 to pivot about hinge 52 between the unlatched and latched positions. Latch 50 and hinge 52 may be configured to place latch 50 inside the outer periphery of the container, flush with the outer periphery of the container, or outside the outer periphery of the container. Hinge 52 optionally may be configured to allow the user to easily tear latch 50 away from container without undue effort or cutting tools.

Latch 50 includes a lid retainer that secures the latch to the lid when the latch is in the latched position with the lid in the closed position. In the exemplary embodiment shown in the drawings, a latching finger 54 is used to engage the lid to hold latch 50 in the latched position. Latching finger 54 may be disposed through an opening 56 or may engage a ledge on a corresponding latch finger 56 to engage the lid with a snap fit.

Figure 7:
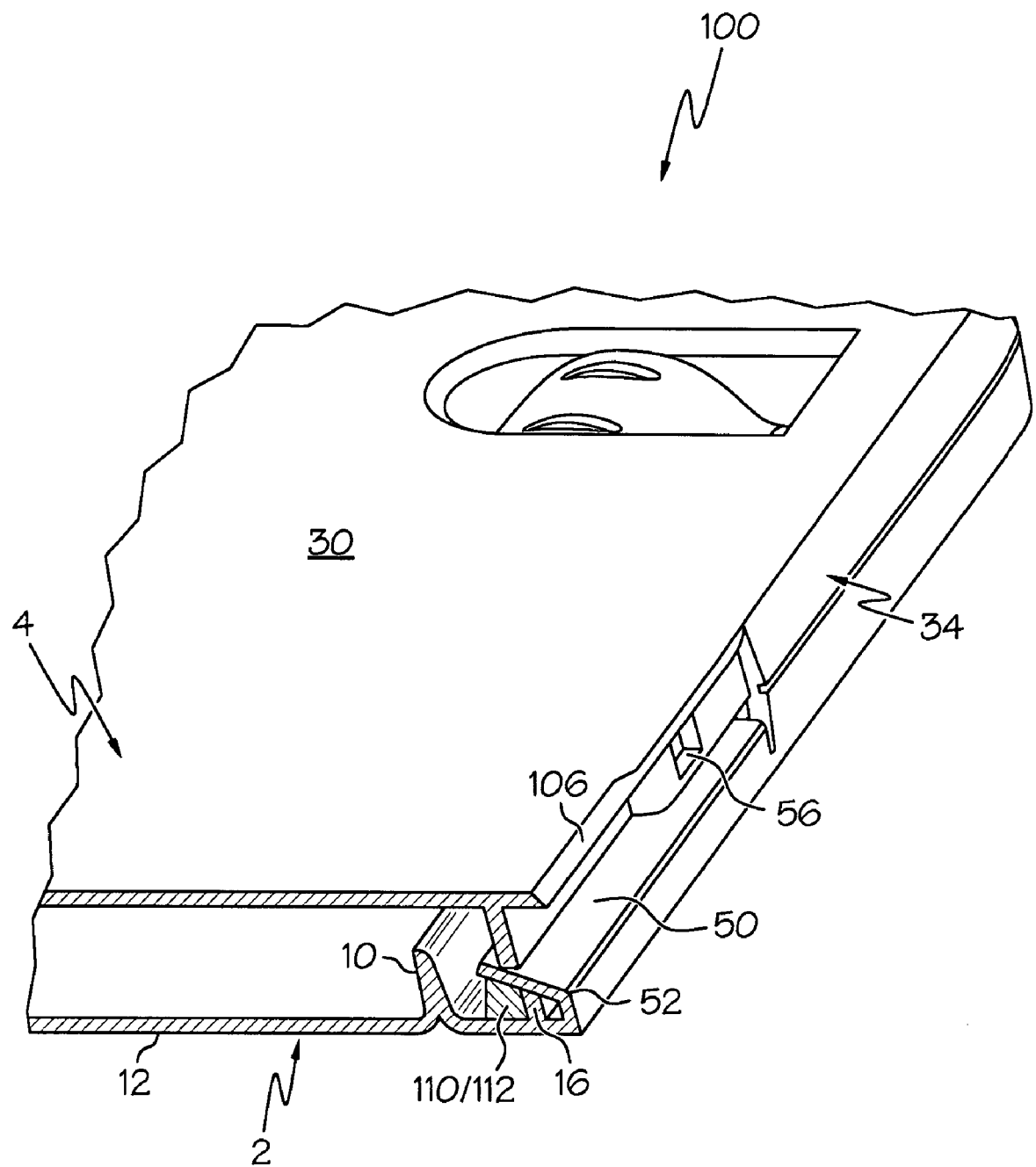
FIG. 7 is a perspective view of the lid closed with the latch in the storage position.

An exemplary configuration of a media storage container with a storable latch is indicated generally by the numeral 100 in FIGS. 1-7. Container 100 includes an outer latch 50 that holds a lid 4 closed to a base 2 when latch 50 is in the latched position shown in FIG. 6. Latch 50 also may be moved to a storage position in which latch 50 is disposed inwardly of the outer periphery of the container as shown in FIG. 7. Latch 50 may define a finger detent or recess 104 to allow the user to grasp latch 50 to pull it from the latched position to the unlatched position. Front wall 34 may be chamfered or recessed at 106 to allow detent or recess 104 to be grasped.

Fingers 54 may be disposed at or adjacent the outer ends of latch 50. Latch 50 is disposed at the central indent 40 defined by front wall 16 of base 2. Latch 50 may thus be flush with the outer surfaces of walls 16 and 34 or inwardly of the outer surfaces of walls 16 and 34. Front wall 16 of base 2 is not formed entirely (it has a shorter height than the edge portions of wall 16) across this recess to create an opening that allows a portion of latch 50 to be moved through or across wall 16 to its storage position. The area where latch 50 extends across wall 16 is referred to as a gap 58 in front wall 16. Openings or ledges 56 may be defined by portions of front wall 34 that define indent 40 at front wall 34.

Latch 50 and the container portion to which latch 50 is hinged define a latch retainer that holds latch 50 in the storage position of latch 50. A variety of latch retainers may be used to hold latch 50 in the storage position. In the exemplary embodiment, two pairs of latch retaining arms 110 project inwardly from the inner surface of latch 50. Each pair of arms 110 define a space between the arms that receives a retaining post 112 disposed inside the outer periphery of the container. Post 112 may be frictionally received between arms 110 or may be received in a snap fit or interference fit. Posts 112 are disposed between nest 10 and the inner surface of front wall 16. The positions of arms 110 and posts 112 may be reversed or alternated.

Lid 4 may be fully closed when latch 50 is in the storage position as shown in FIG. 7. When latch 50 is in the storage position, a portion of lid 4 may optionally engage latch 50 when lid is closed onto latch 50. A portion of latch 50 may extend over nest 10 to be disposed over the item of recorded media to help prevent the item from falling out of retainer 6.

This configuration of the container allows latch 50 to be molded in the unlatched position. Container may then be closed and latched for shipping without creating a container profile that is larger than a standard container. The containers may be shipped to a replicator where the container may be run through standard automation processes that place the item of recorded media in the container. The containers are opened by unlatching latch 50 and opening lid 4. Once the item of recorded media is loaded, lid 4 is closed and latch 50 is moved to the latched position. The loaded container then may be wrapped and delivered to a retail facility. When the customer purchases the container, the customer moves latch 50 from the latched position to the unlatched position, opens lid 4, and pivots latch 50 into to its storage position where latch 50 is securely retained by retainers 110 and 112. The customer then may use the container just as a typical storage container would be used. In the alternative, the customer may remove latch 50 by tearing hinge 52.

Figure 8:
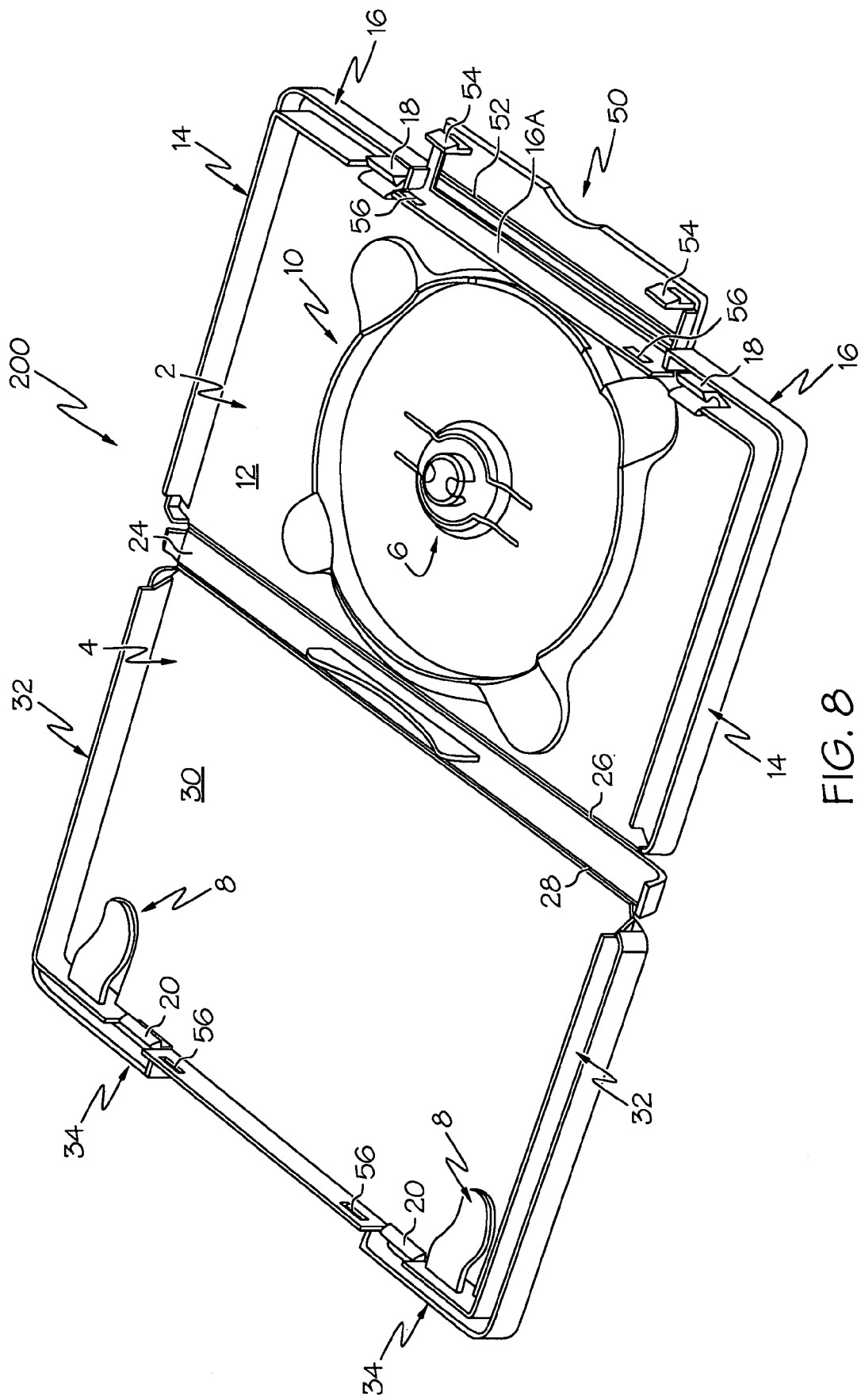
FIG. 8 is a perspective view of an alternative embodiment of a container having an external latch.

An alternative embodiment of the container is shown in FIG. 8 and is indicated by the numeral 200. In this embodiment, each of the walls 14, 16, 32, and 34 is doubled with an inner portion and an outer portion. The outer portions of the sidewalls are configured to abut each other while the inner portions of the sidewalls overlap and may abut the top and bottom walls. The front walls also overlap and abut to define a double wall around three sides of the container. At the indented portion 40, latch 50 forms the outer portion of the double wall when the latch is in the latched position. Fingers 54 pass through openings 56 in lid wall 34 as well as openings 56 defined by the inner portion 16A of base front wall 16. Latch 50 may be moved to the storage position by snapping latch 50 into the openings 56 defined by the inner portion 16A of the base wall 16.

The concepts of the different configurations may be interchanged with each other to provide further container configurations.

The invention claimed is:

1. A media storage container comprising:
   a base having a bottom wall and a front wall; the front wall defining an indented portion;
   a lid hinged to the base and movable between open and closed positions; the lid having a top wall and a front wall; the front wall defining an indented portion;
   the base and lid defining an outer periphery of the container when the lid is in the closed position;
   a latch connected to the base with a hinge; the latch being aligned with the indented portion of the front wall of the base;
   the latch being movable between unlatched, latched, and storage positions;
   in the latched position, the latch engaging the lid to prevent the lid from being moved to the open position;
   in the unlatched position, the latch allowing the lid to move between the open and closed positions;
   in the storage position, the latch being disposed inwardly of the outer periphery of the base and lid when the lid is closed; the lid being movable between the open and closed positions; and
   a latch retainer associated with the base and the latch; the latch retainer cooperating with a releasable snap fit connection to retain the latch in the storage position.

2. The container of claim 1, wherein the portion of the latch retainer associated with the base of the container is positioned inwardly of the front wall of the base.

3. The container of claim 2, wherein the base includes a nest wall adapted to at least partially surround an item of recorded media carried by the base; the portion of the latch retainer associated with the base being disposed between a portion of the nest and the front wall of the base.

4. The container of claim 1, wherein the latch retainer includes a pair of latch retaining arms projecting from the latch and a post projecting from the base; the retaining arms engaging the post in a releasable snap fit connection when the latch is moved to the storage position.

5. The container of claim 1, wherein the base includes a hinge wall and a bottom wall;
   the hinge wall being connected to the bottom wall with a first living hinge and the hinge wall is connected to the lid with a second living hinge; the first and second living hinges being parallel and spaced apart; the latch hinge being substantially parallel to the first and second living hinges.

6. The container of claim 1, wherein the lid contacts a surface of the latch when the latch is in the storage position and the lid is in the closed position.

7. The container of claim 1, wherein the lid and the latch include portions of a lid retainer that releasably retains the latch to the lid when the lid is in the closed position and the latch is in the latched position.

8. The container of claim 7, wherein the lid retainer includes a latching finger extending from the latch that releasably snap fits with the lid.

9. The container of claim 1, wherein the front wall of the base defines a gap that allows the latch to pivot through the front wall of the base from the unlatched position to the storage position while the lid is open.

10. The container of claim 1, wherein the latch pivots between the three positions.

11. The container of claim 1, wherein the latch may be removed from the container by tearing the latch from the container.

12. A media storage container comprising:
    a base having a bottom wall and a front wall; the front wall defining an indented portion; the front wall defining a gap at the indented portion of the front wall;
    a lid hinged to the base and movable between open and closed positions; the lid having a top wall and a front wall; the front wall defining an indented portion;
    a latch connected to the base with a hinge; the latch being aligned with the gap defined by the front wall of the base;
    the latch being movable between unlatched, latched, and storage positions;
    in the latched position, the latch engaging the lid to prevent the lid from being moved to the open position;
    in the unlatched position, the latch allowing the lid to move between the open and closed positions;
    in the storage position, a portion of the latch being disposed across the indented portion of the front wall of the base and the lid being movable between the open and closed positions; and
    a latch retainer associated with the base and the latch; the latch retainer cooperating with a releasable snap fit connection to retain the latch in the storage position.

13. The container of claim 12, wherein the portion of the latch retainer associated with the base of the container is positioned inwardly of the front wall of the base.

14. The container of claim 13, wherein the base includes a nest wall adapted to at least partially surround an item of recorded media carried by the base; the portion of the latch retainer associated with the base being disposed between a portion of the nest and the front wall of the base.

15. The container of claim 12, wherein the latch retainer includes a pair of latch retaining arms projecting from the latch and a post projecting from the base; the retaining arms engaging the post in a releasable snap fit connection when the latch is moved to the storage position.

16. The container of claim 12, wherein the base includes a hinge wall and a bottom wall; the hinge wall being connected to the bottom wall with a first living hinge and the hinge wall is connected to the lid with a second living hinge; the first and second living hinges being parallel and spaced apart; the latch hinge being substantially parallel to the first and second living hinges.

17. The container of claim 12, wherein the lid contacts a surface of the latch when the latch is in the storage position and the lid is in the closed position.

18. The container of claim 12, wherein the lid and the latch include portions of a lid retainer that releasably retains the latch to the lid when the lid is in the closed position and the latch is in the latched position.

19. The container of claim 18, wherein the lid retainer includes a latching finger extending from the latch that releasably snap fits with the lid.

20. A media storage container comprising:
    a base having a bottom wall and a front wall; the front wall defining an indented portion; the front wall defining a gap at the indented portion of the front wall;
    a lid hinged to the base and movable between open and closed positions; the lid having a top wall and a front wall; the front wall defining an indented portion;
    a latch connected to the base with a hinge; the latch being aligned with the gap defined by the front wall of the base;
    the latch being movable between unlatched, latched, and storage positions;
    in the latched position, the latch engaging the lid to prevent the lid from being moved to the open position;

in the unlatched position, the latch allowing the lid to move between the open and closed positions;

in the storage position, a portion of the latch being disposed across the indented portion of the front wall of the base and the lid being movable between the open and closed positions;

a latch retainer having portions associated with the base and the latch; the latch retainer portions cooperating with a releasable snap fit connection to retain the latch in the storage position;

the portion of the latch retainer associated with the base of the container is positioned inwardly of the front wall of the base; and a lid retainer having portions associated with the lid and the latch; the lid retainer portions cooperating with a releasable snap fit connection to retain the latch in the latched position.

\* \* \* \* \*